No. 839,429. PATENTED DEC. 25, 1906.
G. N. & S. E. SHOOK.
LINING FOR JOURNAL BEARINGS.
APPLICATION FILED JUNE 2, 1904.
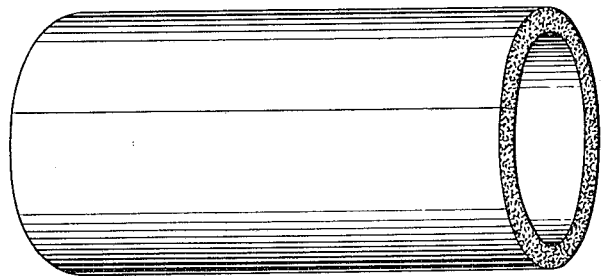
Witnesses
R. Champion
Chas. D. King.
Inventors
George N. and Solomon E. Shook.
By their Attorney

UNITED STATES PATENT OFFICE.

GEORGE N. SHOOK, OF AKRON, AND SOLOMON E. SHOOK, OF CUYAHOGA FALLS, OHIO.

LINING FOR JOURNAL-BEARINGS.

No. 839,429. Specification of Letters Patent. Patented Dec. 25, 1906.

Application filed June 2, 1904. Serial No. 210,770.

*To all whom it may concern:*

Be it known that we, GEORGE N. SHOOK, a resident of Akron, and SOLOMON E. SHOOK, a resident of Cuyahoga Falls, in the county of Summit and State of Ohio, citizens of the United States, have invented certain new and useful Improvements in Linings for Journal-Bearings, of which the following is a specification.

This invention relates to linings for journal-bearings; and its principal object is to provide a lining which can be used for a long period of time as a bearing for a journal running either at high or low speed and remain cool and run substantially without wear and with but slight attention under all conditions of use.

We have found that journal-bearings, such as shaft-bearings, may be provided with an antifriction-lining which will form a perfectly smooth bearing-surface and remain cool even when the journal or shaft is run at high speeds for long periods of time. These results we accomplish by substituting for Babbitt metal and other metallic antifriction compositions for lining journal-bearings a lining which is non-metallic and has practically no tendency to become heated when a journal is run at high speed in contact therewith and by subjecting this non-metallic non-heating body or lining to the action of a suitable compound containing constituents for glazing the bearing-surface of the lining and for abstracting the heat developed by the rotation of the journal and absorbing and dissipating the same without heating up the body portion of the lining.

The drawing illustrates in perspective a lining for journal-bearings which embodies our invention.

For the body of the lining we prefer to make use of strawboard; but any equivalent non-metallic body which is a poor conductor of heat and has sufficient strength to support the journal properly may be employed. This strawboard is subjected at a proper temperature to the action of a suitable composition capable of imparting lubricating, glazing, and heat-abstracting properties to the strawboard or equivalent material. As the lubricating medium we prefer to make use of a drying-oil, such as linseed-oil, which when dry forms a lubricating coating or lubricating glaze on the bearing-surface of the body or lining proper and is also capable of impregnating the strawboard throughout the same, so as to assure thorough lubrication thereof. For the purpose of abstracting such heat as may be developed by a journal running in contact with a lining which is itself a poor conductor of heat we prefer to impregnate the lining or strawboard with a suitable cooling medium, such as ordinary salt, the action of which for such purpose is well understood. In order to give the necessary body to the glaze which is formed on the bearing-surface by the action of a journal in contact with the lining of the bearing, we also prefer to add to the lining a small percentage of litharge, which readily forms a smooth and substantial glaze. In addition to these substances we also prefer to employ a small quantity of a binder, such as gum-shellac, which serves to stiffen and strengthen the strawboard. All of these substances are preferably dissolved and mixed, the preferred proportions of the ingredients being one quart of linseed-oil, one-fourth of a pound of salt, one-eighth of an ounce of litharge, and one-fourth of an ounce of gum-shellac. Alcohol or turpentine should first be added to the shellac to soften it, so that it will be in a jelly-like state and will mix with the other ingredients more readily. Preferably the salt is first dissolved in hot water to form a saturated solution and is then added to the linseed-oil, the litharge and the gum-shellac being also added, and the mixture then heated to a temperature of about 232° centigrade, after which the strawboard is dipped in the solution while the solution is at this temperature. As soon as the surplus liquid is drained from the body or lining of strawboard or equivalent material such lining is ready for use.

Long use of journal-bearings provided with linings made in this manner has fully demonstrated the utility of such material. The bearing-surface of such a lining becomes glazed soon after it is subjected to use, and a perfectly smooth bearing-surface is formed, on which the friction when running in contact with a journal is reduced to a minimum. The smooth bearing-surface formed by the conjoint glazing of the salt, the litharge, and the oil remains smooth and shows practically no signs of wear after it has once been perfectly glazed by use. Moreover, the bearing remains perfectly cool and requires but a few drops of oil at intervals of a week or more in order to maintain it in perfect condition. This is due partly to the fact that the body of the lining is a poor conductor of heat, partly to the fact that a non-heating and practically frictionless glaze is formed on and constitutes the bearing-surface of the lining, and partly to the fact that such heat as is developed is quickly abstracted and is absorbed and dissipated, owing to the presence of the salt, which when heated gives off a portion of the water in which it was dissolved and causes the bearing-surface to soften slightly and reduce the friction, and this water being spread over a great area of journal-surface abstracts and dissipates the heat, and, cooling quickly, is taken up again by the dissolved salt. It has also been found that in case any grit gets into the bearing the heating action resulting from the presence of the grit causes the lining to be softened sufficiently to take up the grit, and the grit becomes embedded in the body of the lining below the wearing-surface—that is, outside the bearing-surface—which closes over again and renews its frictionless glaze at the bearing-surface. Any small foreign substance which enters the bearing is taken up and embedded in this manner without affecting the action of the bearing except momentarily while such substance is being embedded in the lining.

A lining of this type is entirely different in its action from a metallic lining of the usual antifriction type and besides is much more readily placed in position and brought to a perfect bearing-surface, it being well known that with the ordinary antifriction metal it is necessary to melt the metal and pour it into the journal-box, which if screwed up too tightly causes overheating of the bearing and melting of the antifriction metal, which then has to be remelted and poured again.

What we claim is—

1. A glazed and lubricated non-heating lining for journal-bearings, said lining comprising fibrous material substantially as specified impregnated with lubricating and glazing substances and sodium chlorid, and a binder.

2. A glazed and lubricated non-heating lining for journal-bearings, said lining comprising fibrous material substantially as described impregnated with a drying-oil, sodium chlorid, litharge and a binder.

Signed at Akron, in the county of Summit and State of Ohio, this 28th day of May, A. D. 1904.

GEORGE N. SHOOK.
SOLOMON E. SHOOK.

Witnesses:
H. J. BINGHAM,
ARTHUR SHARP.